Oct. 26, 1954

C. M. O'LEARY 2,692,514

TRACTOR DRIVE

Filed Nov. 26, 1951

CHARLES M. O'LEARY,
INVENTOR.

BY

ATTORNEY

Oct. 26, 1954     C. M. O'LEARY     2,692,514
TRACTOR DRIVE Filed Nov. 26, 1951     4 Sheets-Sheet 2

CHARLES M. O'LEARY,
INVENTOR.

BY

ATTORNEY

Oct. 26, 1954   C. M. O'LEARY   2,692,514
TRACTOR DRIVE

Filed Nov. 26, 1951   4 Sheets-Sheet 3

CHARLES M. O'LEARY,
INVENTOR.

BY

ATTORNEY

Patented Oct. 26, 1954

2,692,514

UNITED STATES PATENT OFFICE 2,692,514

TRACTOR DRIVE

Charles M. O'Leary, Los Angeles, Calif.

Application November 26, 1951, Serial No. 258,269

12 Claims. (Cl. 74—710.5)

The present invention relates to an automatic multiple speed transmission mechanism and more particularly to an automatic multiple speed transmission mechanism in combination with a hydrokinetic torque converter which will maintain the speed ratio of the converter within a range of predetermined efficiency regardless of variations in the load.

It is an object of the present invention to provide an improved automatic multiple speed transmission.

Another object of my invention is to provide a transmission having gear ratios which are multiples of the speed and torque changes in an associated hydrokinetic torque converter which are necessary in order to keep the converter within the desired efficiency range.

Another object of my invention is to provide a single five speed transmission having two output shafts which may be selectively braked for steering purposes.

Another object of my invention is to provide, in combination with a hydrokinetic torque converter, an automatic multiple speed ratio transmission which will maintain the speed ratio of the converter within predetermined limits regardless of variations in the input speed of the converter.

Another object of my invention is to provide an improved mechanism for actuating a control instrumentality in response to the existence of a predetermined ratio between the speeds of two shafts.

Another object of my invention is to provide an automatic shifting mechanism for a multiple speed transmission of the character described which consists essentially of eddy-current clutches and fluid valves.

Another object of my invention is to provide a multiple speed transmission of the character described having two output shafts which may be differentially connected.

Another object of my invention is to provide an automatic multiple speed transmission mechanism which is particularly adapted for use in trucks, tractors and military tanks.

Another object of my invention is to provide, in an automatic multiple speed transmission mechanism of the character described, an automatic shifting mechanism which is sturdy, durable and capable of withstanding adverse conditions in the field.

A further object of my invention is to provide a transmission which has the unusually flexible characteristics of a hydrokinetic torque converter drive, while at the same time continually operating above a predetermined high efficiency.

Other objects and advantages of my invention will be apparent from the following description and claims, the novelty consisting in the features of construction, combination of parts, the unique relations of the members and the relative proportioning, disposition and operation thereof, all as is more completely outlined herein and as is particularly pointed out in the appended claims.

In the accompanying drawings, forming a part of this present specification.

Figure 1:
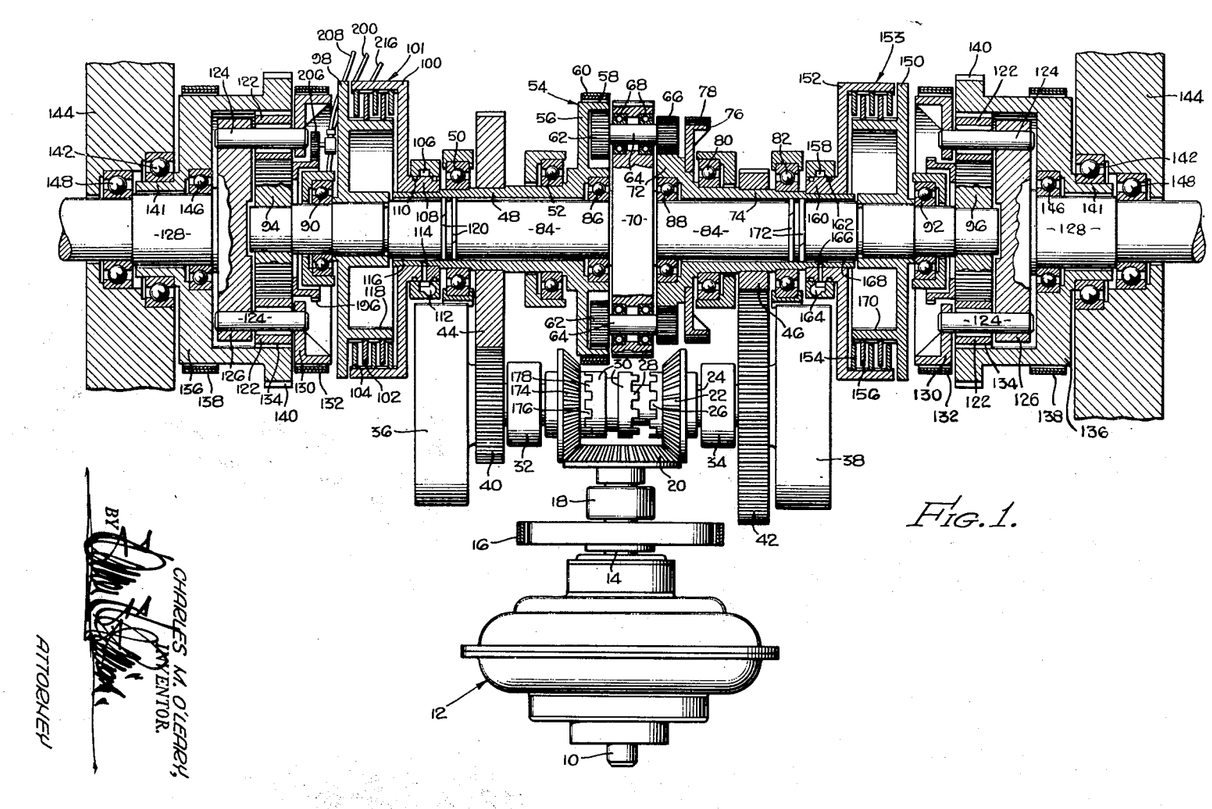
Figure 1 is a plan view, partly in section, of my five-speed transmission and hydrokinetic torque converter.

Referring to the drawings, I will first describe my five speed transmission, which is shown in Figure 1.

Connected to the engine (not shown) is input shaft 10 of hydrokinetic torque converter 12. Although converter 12 may be of any suitable construction to provide an efficiency curve similar to that shown in Figure 8, I prefer to use a converter 12 which may be alternatively shifted back and forth from a fluid drive connection to a direct drive connection. Such a hydrokinetic torque converter is particularly described in my application Serial No. 263,419, filed December 26, 1951.

Output shaft 14 of hydrokinetic torque converter 12 is provided with a brake 16 and is supported within a bearing cartridge 18. Integrally attached to the end of output shaft 14 is a pinion gear 20 which meshes with a right-hand bevel gear 22 floatingly mounted on transmission reversing shaft 24.

Clutch teeth 26 form a clutch face on bevel gear 22, and are adapted to operatively engage the opposing clutch teeth 28 of clutch member 30 which is keyed or splined to shaft 24 in slideable engagement therewith.

Shaft 24 is journaled in bearings 32 and 34. Disposed about the opposing ends of shaft 24 are clutches 36 and 38, which respectively connect gears 40 and 42 to the shaft 24 upon engagement. Gears 40 and 42 are operatively engaged to the respective gears 44 and 46, gear 44 being integrally attached to a cylindrical shaft 48.

Shaft 48 is supported in bearings 50 and 52 which are integrally attached to the transmission housing.

An integral ring gear 54 is carried as an integral part of shaft 48 by means of flange 56 at the end of shaft 48. The outer periphery 58 of ring gear 54 is smooth so as to form a brake drum to receive brake band 60. A plurality of gears 62, which are mounted on shafts 64, mesh with the internal ring gear 54. Mounted on the other ends of shafts 64 are gears 66. Shafts 64 are journaled in bearings 68 which are carried by a planet cage carrier 70. Thus, planet cage carrier 70 carries bearings 68, shafts 64, gears 62 and gears 66.

In operative engagement with gears 66 is a gear 72 which forms an integral part of a tubular shaft 74. Also forming an integral part of tubular shaft 74 is a brake drum 76 which may be operatively engaged by a brake band 78. Tubular shaft 74 is journaled in bearings 80 and 82 which are affixed to the transmission housing.

Planet cage carrier 70 is keyed or splined to a central shaft 84 which is journaled in bearing 86 carried by shaft 48 and bearing 88 carried in shaft 74. The outer ends of shaft 84 are mounted in bearings 90 and 92, respectively, which are carried in the transmission housing. A pair of gears 94 and 96 are integrally attached to the respective ends of shaft 84.

Opposing clutch members 98 and 100 are carried by shafts 84 and 48, respectively, these two clutch members together forming a clutch 101. Clutch members 98 and 100 are keyed or splined to shafts 84 and 48, respectively, so as to rotate with those shafts. Although clutch 101 may be of any conventional construction, I prefer to use a hydraulically operated clutch which may be actuated by admitting fluid under pressure thereto.

Engagement of clutch members 98 and 100 is effected by moving hydraulically operable clutch plates 102 and 104 on clutch members 98 and 100, respectively, together into a frictional contact with each other. An annular fluid pressure chamber 106 is disposed about a tubular extension 108 of clutch member 100. Fluid is confined within chamber 106 by means of packing rings 110 in tubular extension 108. Fluid enters the clutch system through port 112 which is connected to fluid pressure chamber 106. The fluid then passes through radial passage 114 into tubular passage 116 which conveys the fluid to chamber 118 within clutch member 98. Sealing rings 120 are provided on shaft 84 to confine the clutch actuating fluid to chamber 118. Upon actuation of clutch 101, tubular shaft 48 and central shaft 84 will be connected so as to turn as a single unit.

Gear 94 at one end of central shaft 84 drives a plurality of planet gears 122 which are carried on shafts 124. Shafts 124 are mounted in a planet carrier 126 which is integrally connected to transmission output shaft 128. A brake flange 130 is mounted on the ends of shafts 124 so as to move as an integral unit with planet cage carrier 126. Brake band 132 is operatively engageable with brake flange 130 to selectively arrest the rotary motion of planet carrier 126.

An internal gear 134 which is carried by reaction drum 136 meshes with the planet gears 122. Annularly disposed about reaction drum 136 is a brake band 138 which may be used to stop rotation of drum 136. A gear 140 is externally mounted upon drum 136 for use in connection with my differential unit which will be hereinafter described.

Reaction drum 136 is formed in a tubular shaft 141 at one end, whereby drum 136 can be supported through shaft 141 by bearing 142 that is mounted within the transmission housing 144. Bearing 146 carried by drum 136 supports the transmission output shaft 128. Output shaft 128 is further supported by bearing 148 in housing 144.

Splined or keyed to shaft 84 near the other end thereof is a clutch member 150 similar to clutch member 98. Clutch member 152 is keyed or splined to the cylindrical shaft 74 to form, together with clutch member 150, the complete clutch 153. Clutch plates 154 and 156 are keyed or splined to clutch members 152 and 150, respectively, and are adapted to be compressed together by fluid pressure in the same manner as clutch plates 102 and 104.

Fluid pressure chamber 158 is annularly disposed about a tubular extension 160 of clutch member 152, fluid being sealed within chamber 158 by means of packing rings 162. Fluid is conveyed into chamber 158 through a fluid port 164, and this fluid passes from chamber 158 through a fluid passage 166 and communicates through cylindrical passage 168 with fluid chamber 170 in clutch member 150.

Fluid is confined within chamber 170 by means of sealing rings 172 which are annularly disposed between shafts 84 and 74.

It will be noted that clutches 101 and 153 are identical in construction and that actuation of either of these clutches will create the same mechanical result by effecting the same gear ratio between reversing shaft 24 and output shaft 128. This occurs because engagement of clutch 153 locks quill shaft 74 to shaft 84. This locks planet cage 70 which is splined to shaft 84, to the quill shaft 74. Since no relative rotation can occur between cage 70 and quill shaft 74, no relative rotation can occur between quill shaft 74 and gears 62, 66 and 54, so that quill shaft 48, which is integral with gear 54, rotates in a 1 to 1 ratio with quill shaft 74. Thus, the same result is reached by engaging clutch 153 as is effected by engaging clutch 101. Thus, a single clutch could be utilized in place of the pair of clutches 102 and 153. However, my automatic shifting mechanism is simplified by the use of two fluid actuated clutches instead of using a single clutch. This will become more apparent from the description of my automatic shifting machinism.

Gear 96 integrally mounted on the end of internal shaft 84, drives a plurality of planet gears 122 which are rotatably mounted on shafts 124. Shafts 124 are affixed in planet carrier 126 which forms an integral part of output shaft 128. Affixed to the outer ends of shafts 124 is a brake flange 130 which may be operatively engaged by a brake band 132.

An internal gear 134 is carried by reaction drum 136 and meshes with the planet gears 122. Brake band 138 is disposed about reaction drum 136. Gear 140 is carried on the outside of drum 136 to engage the differential unit which will be hereinafter described.

A tubular shaft 141 is formed at one end of reaction drum 136 and is supported in bearing 142 which is mounted in the transmission housing 144. Bearing 146 is carried by reaction drum 136 and serves to support transmission output shaft 128. Output shaft 128 on this side of the transmission is also supported by bearing 148 which is mounted in housing 144.

My five-speed transmission may be used in either a forward or a reverse drive connection. I provide a reverse bevel gear which engages the pinion gear 20 on the side thereof opposite the engagement between pinion gear 20 and bevel gear 22. Bevel gear 174 is floatingly mounted on transmission reversing shaft 24 and is provided with clutch teeth 176 which are adapted to be selectively engaged and disengaged with the clutch teeth 178 on clutch member 30. Engagement between clutch teeth 26 and clutch teeth 28 causes forward rotation of the transmission members, while engagement between clutch teeth 176 and 178 causes reverse rotation of the transmission members.

In order to shift my transmission into its lowest gear, which is a four to one reduction, clutch 36 and brake band 78 are engaged. This provides a two to one reduction ratio between gears 40 and 44, and also a two to one reduction ratio between gears 54, 62, 66 and 72, this latter two to one reduction being applied to shaft 84 through planet cage 70 which is keyed or splined thereto.

In order for this four to one gear reduction to be applied to output shafts 128, it is necessary for brake bands 138 to lock reaction drums 136 into stationary relationship with the transmission housing. Any further gear reduction may be applied between shaft 84 and shaft 128 by making gears 94 and 96 and planet gears 122 of the proper relative sizes. Thus, in the preferred embodiment of my invention, I provide a fixed five to one gear reduction between shaft 84 and shafts 128.

In order to shift my transmission from the four to one reduction ratio of low gear into a two to one reduction ratio in second gear, I release band 78 and engage clutch 101. Clutch 101 locks shafts 48 and 84 together, whereby the only gear reduction will be between gears 40 and 44, which cause a two to one reduction.

In order to shift from second to third gear, I release clutches 36 and 101 and engage clutch 38 and band 60. Engagement between gears 42 and 46 causes a two to one overdrive, but there is also a two to one reduction between gears 72, 66, 62, 54 and the planet cage carrier 70, which is keyed or splined to the central shaft 84. This two to one overdrive in combination with a two to one reduction will cause third gear to be a one to one ratio.

Shifting now from third gear into fourth gear, I release band 60 and engage clutch 153. Clutch 153 locks tubular shaft 74 to central shaft 84, whereby the only two gears which must be considered are gears 42 and 46, which provide a two to one overdrive.

It should be noted at this point that the two to one overdrive of fourth gear could also be effected by engaging clutch 101 instead of clutch 153, or by engaging both clutches 101 and 153. Any one of these combinations may be utilized if the gears are to be shifted manually, or only a single clutch need be used in place of both clutches 101 and 153 if there is to be manual shifting. However, my automatic shifting mechanism as hereinafter described is simplified by the use of two clutches 101 and 153, which are selectively engaged and disengaged as the different input to output gear ratios are effected through my transmission.

In order to shift into fifth gear clutches 101 and 153 are in the disengaged position and all bands are released, and the only two engaged members are clutches 36 and 38. This causes a two and one-half to one overdrive ratio between shafts 24 and 84.

In the preferred embodiment of my invention, I utilize a hydrokinetic torque converter 12 which may be shifted alternatively between a fluid drive connection and a direct drive connection, as heretofore pointed out in column 2, lines 46 to 47. Such a torque converter is shown and described in my application Serial No. 263,419, filed December 26, 1951. The use of such a torque converter permits the operator to use my five-speed transmission either with the highly efficient direct drive connection or with the highly flexible hydrokinetic torque converter connection. Such a direct drive connection is particularly useful when my transmission is used in connection with relatively light loads.

In order to turn the tractor, tank or other vehicle which utilizes my transmission it is merely necessary to release the reaction member 136 on one side of my transmission by releasing the brake band 138 on that side, so that the reaction member 136 merely idles, and no reaction force is applied to the planet gears 122 on that side of the transmission. Brake band 132 is then moved into operative engagement with brake flange 130 to arrest the rotation of planet carrier 126 and output shaft 128 on that side of the transmission. This will completely stop the track, wheel or other means of locomotion which is attached to output shaft 128 on one side of my transmission, while the track or wheel on the other side of the transmission will continue to receive power through the other output shaft 128 to which it is attached.

Bands 132 are both released, and bands 138 are both engaged for my transmission to be utilized for driving straight ahead instead of for turning.

Figure 9:
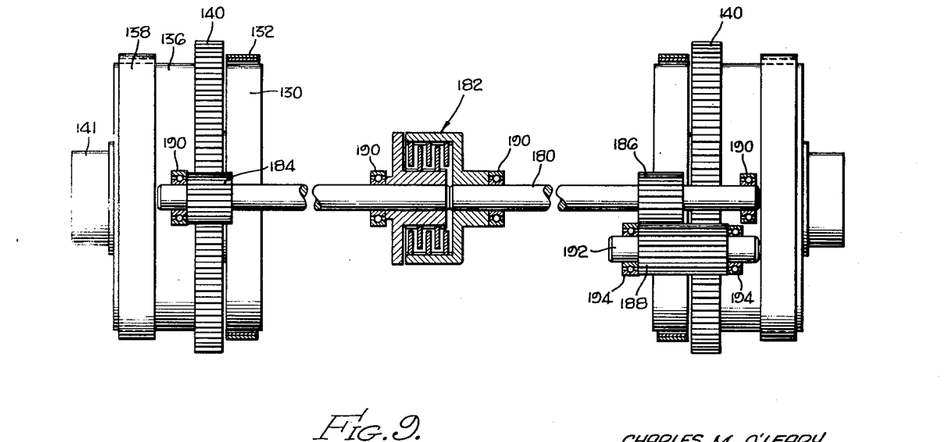
Figure 9 is a side elevation, partly in section, showing my differential unit which may be engaged into operative relationship with my transmission shown in Figure 1.

Turning now to my differential unit which is illustrated in Figure 9, this unit may be optionally provided in my transmission. This differential unit is particularly useful in connection with heavy off-the-highway trucks, but it may be used in tractors or tanks or the like.

Gears 140 on reaction drums 136 are connected together through differential shaft 180 which is separated into two portions by means of a clutch 182. Although the clutch 182 illustrated in Figure 9 is a fluid actuated type of clutch similar to the clutches 101 and 153 in Figure 1, it is to be understood that clutch 182 can be of any conventional construction.

A gear 184 is integrally mounted on one end of shaft 180 and is in engagement with one of the gears 140. Gear 186 is mounted on the other end of shaft 180 and is in engagement with a reverse gear 188 which also meshes with the other gear 140. Both sections of shaft 180 are journaled in four bearings 190, and shaft 192 which carries reverse gear 188 is journaled in bearings 194.

When clutch 182 is engaged, both portions of shaft 180 are locked together as a unit to form a reaction balancing means between the two gears 140. Normally, when clutch 182 is engaged, the reaction drum bands 138 are released, whereby the reaction for each of the drums 136 is provided by the other drum 136 through gears 140, gears 184, gears 186 and 188 and shaft 180. Thus, the load is balanced between the two output shafts 128 of the transmission.

Although clutch 182 is normally disengaged when my transmission is to be used for steering through alternatively releasing the respective bands 138, the advantages of a reaction balancing connection between the two output shafts can be utilized during the steering operation by having clutch 182 engaged, and then alternatively engaging the disengaged bands 132 to steer.

Figure 2:
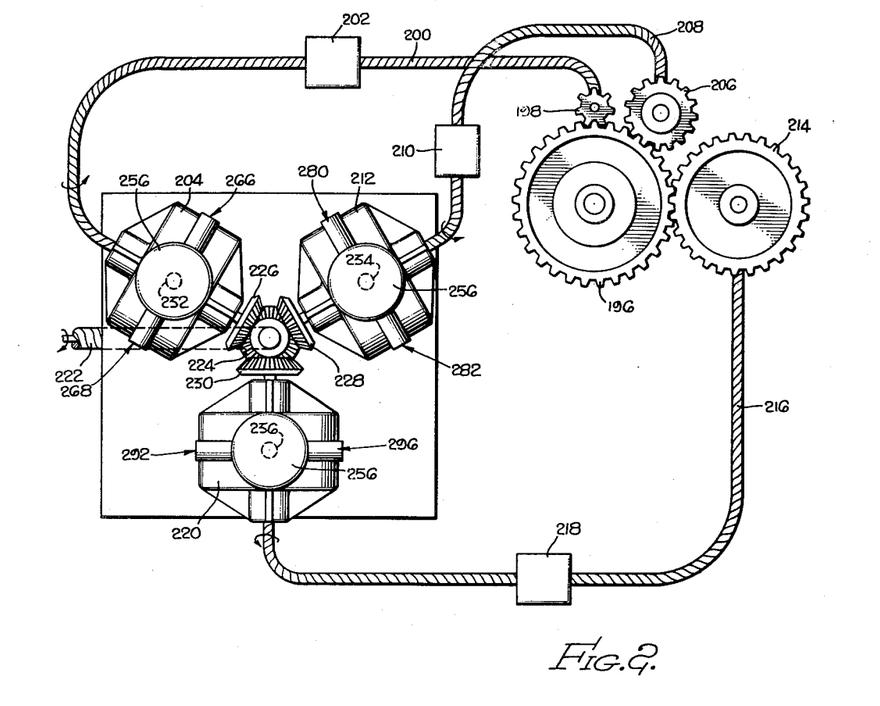
Figure 2 is a plan view of my differential mechanism for determining the automatic shift points.
Figure 3:
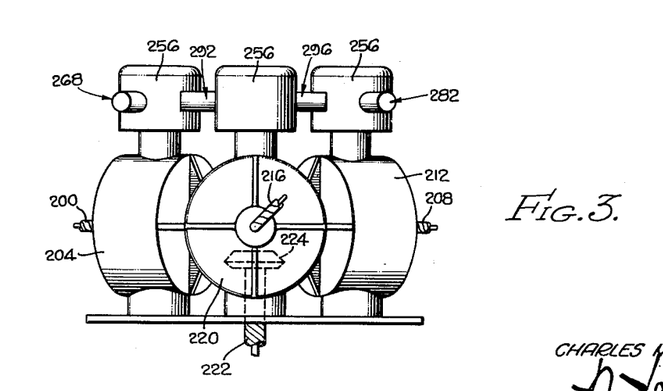
Figure 3 is a side elevation, showing the differential units of Figure 2.

I shall next describe the portion of my automatic shifting mechanism shown in Figures 2 and 3 which determines when a shift will occur, I provide a gear 196 which is mounted on gear 94 in any suitable manner as shown in Figure 1. Gear 196 drives a small differential drive gear 198 which in turn drives a flexible drive cable 200. Disposed intermediate the ends of flexible cable 200 is gear box 202 which has manually operable forward and reverse gears (not shown) therein. Cable 200 is operatively connected to one side of a differential 204.

In a similar manner, I provide a second differential drive gear 206 which is driven by gear 196 as shown in Figures 1 and 2. Gear 206 drives a flexible cable 208 having a forward and reverse gear box 210 therein. Cable 208 is operatively connected to one side of a differential 212. A third differential drive gear 214 is driven by gear 196 and drives flexible cable 216. Cable 216 has forward and reverse gear box 218 therein and is connected to one side of a third differential 220.

A flexible drive cable 222 from the engine (not shown) is operatively connected to a pinion gear 224 which is suitably mounted in means not shown. Bevel gears 226, 228 and 230 mesh with pinion gear 224, these bevel gears driving into differentials 204, 212 and 220, respectively.

Assuming that gear 196 rotates clockwise during forward transmission operation. This causes gears 198, 206 and 214 to all rotate counter-clockwise, and hence the inputs to differentials 204, 212 and 220 through cables 200, 208 and 216 will all rotate counter-clockwise, assuming that the gear boxes 202, 210 and 218 are all in the forward drive position. Flexible cable 222 rotates clockwise, whereby the differentials 204, 212 and 220 will measure the respective differences in speeds between shafts 200, 208 and 216, and shaft 222.

If the transmission is set for reverse operation, then gear boxes 202, 210 and 218 are all set in reverse drive, whereby the now counter-clockwise rotation of gear 196 will still be transmitted to differentials 204, 212 and 220 as counter-clockwise rotation of cables 200, 208 and 216, respectively.

Differentials 204, 212 and 220 are provided with output shafts 232, 234 and 236, respectively, these shafts supporting on one end thereof, disc-shaped, multi-pole permanent magnets 238 which form the input members of eddy-current clutches 240, 242 and 244. The eddy-current clutches are completed by drum portions 246, 248 and 250, which are composed of an electrically conducting material. Drum portions 246, 248 and 250 are affixed to shafts 252 which are independently journaled in bearings 254 disposed in eddy-current clutch housings 256.

Cams 258 and 260 are provided in the periphery of drum portion 246 of clutch 240, these cams being adapted to selectively actuate the actuating stems 262 and 264 of a pair of fluid valves 266 and 268, respectively. Similarly, cams 270 and 272 on the periphery of drum portion 248 of clutch 242 are adapted to selectively actuate the actuating stems 274, 276 and 278 of fluid valves 280, 282 and 284, respectively. In like fashion, cams 286 and 288 on the periphery of drum portion 250 of clutch 244 are adapted to selectively actuate the actuating stems 290 and 292 of valves 294 and 296. By this arrangement, when the eddy-current clutches are in the positions shown in Figure 4, the transmission will be in low gear. At this time, flexible cables 200, 208 and 216 are all rotating slower than cable 222, whereby the clockwise rotation of cable 222 will predominate over the counter-clockwise rotation of cables 200, 208 and the multi-pole magnets 238 will urge the drum portions of eddy-current clutches 240, 242 and 244 in a clockwise direction.

Figure 4:
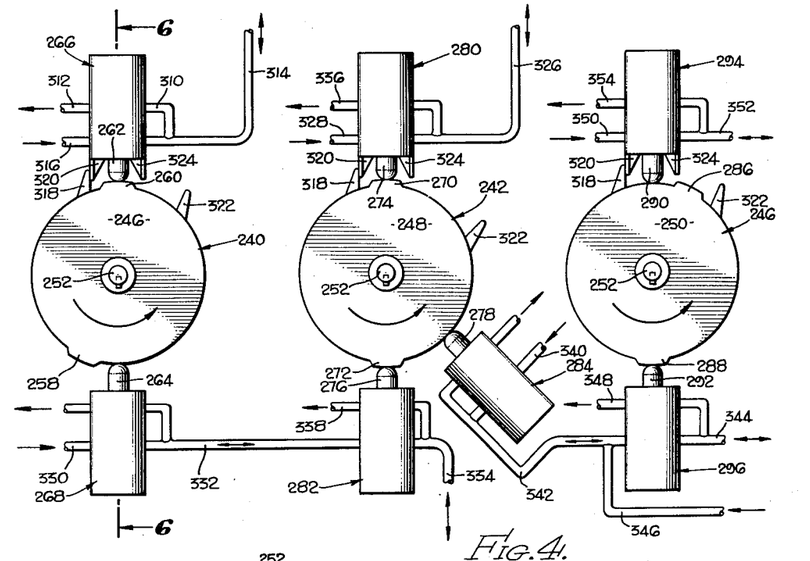
Figure 4 is a plan view of my automatic shifting mechanism.

Since differential drive gear 198 is the smallest of the three differential drive gears, it will rotate the fastest of the three, and when its speed becomes greater than that of cable 222, the output of differential 204 will rotate counter-clockwise, whereby drum portion 246 of eddy-current clutch 240 will move counter-clockwise, actuating valves 266 and 268 to shift the transmission from low to second gear.

Similarly, when differential drive gear 206 rotates faster than cable 222, the output of differential 212 will rotate counter-clockwise, whereby drum portion 248 of eddy-current clutch 242 will move counter-clockwise, actuating valves 280, 282 and 284. In like fashion, valves 294 and 296 are actuated by rotation of gear 214 and cable 216 faster than cable 222.

In order to more clearly describe my automatic shifting mechanism, reference will now be made to the curves shown in Figure 8. Curve A is a plot of torque converter efficiency against output to input speed of the converter. Curve B is a plot of the torque multiplication ratio against output to input speed of the converter. Curve C is a plot of engine torque against engine speed, which reaches a maximum of approximately 1800 R. P. M.

Curves A and B illustrate that with the proper gear ratios in my transmission, and upon proper timing of my automatic shifting, my converter may be continuously operated at its peak efficiency, above 80%. When the output to input speed ratio is 30%, the efficiency, as shown by curve A, is 80%, and the torque multiplication by the converter, as shown in curve B, is 3 to 1. As the output to input speed ratio climbs from 30% the efficiency shown by curve A remains above 80% until the output to input speed ratio becomes 60%, at which time the efficiency is 80% again, and the torque multiplication, as shown by curve B, is 1½ to 1. Thus, in the peak efficiency of the converter, there is a 2 to 1 speed and torque change. By selecting the gear ratios in my automatic change-speed transmission as multiples of this 2 to 1 change, I am able to keep the converter operating above 80% efficiency.

Thus, my low gear, as heretofore indicated, is a 4 to 1 reduction, and when it is operatively engaged as a starting gear, curves A and B are followed from an output to input speed ratio of 0 to a ratio of 60%, at which time there will be an automatic shift from the 4 to 1 reduction of low gear to the 2 to 1 reduction of second gear. This automatic shift to second gear will instantaneously change the converter output to input shaft speed ratio from 60% to 30%, and the curves A and B will be followed in second gear from 30% to 60% output to input ratio, at which time there will be another automatic shift, this time from second gear to third gear, which has a 1 to 1 gear ratio. Again, this shift to third gear will move operation of the converter back to the 30% output to input ratio, and the curves A and B will be followed back up to 60% at which time the third and last automatic shift will occur. Shifting from third to fourth gear and again moving operation back to the 30% output to input ratio in the converter.

Similarly, when my transmission is in fourth gear, and the ratio of output to input shaft speeds of the converter is reduced to 30%, there will be an automatic shift back down to third gear and the output to input shaft speed ratio will become 60% again. When the output to input ratio becomes 30% in third gear, there will be an automatic shift down to second gear. The shift back down to low gear from second will occur in the same manner when the output to input speed ratio reaches 30% in second gear.

Figure 8:
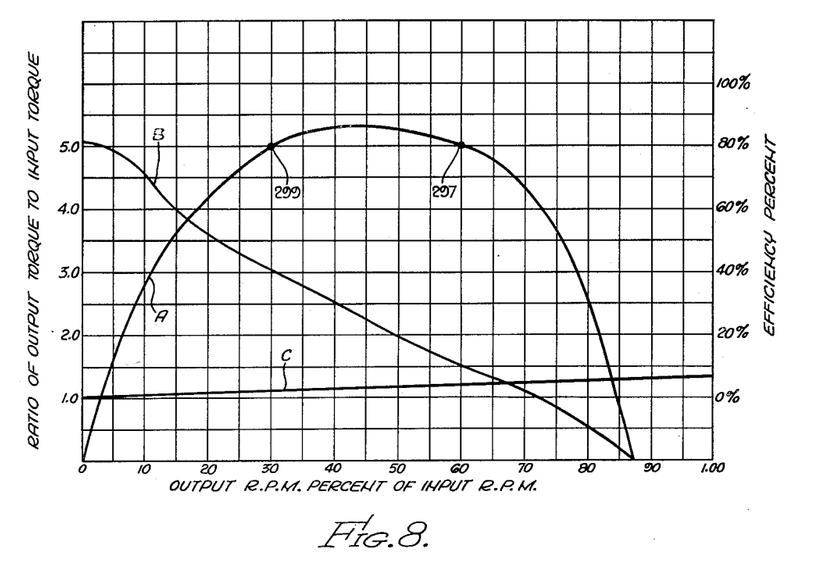
Figure 8 shows the representative torque and efficiency curves of the torque converters employed in the mechanism of Figure 1.

In order to effect the automatic shifts at the proper times so that the curves of Figure 8 may be followed as heretofore described, it now only remains necessary to provide the proper speed ratios in the drives to the differentials 204, 212 and 220. In the ideal case, assuming that the eddy-current clutch 240 would operate at exactly the point of reversal of the direction of rotation of differential output shaft 232 to shift the transmission from low gear to second gear, the gear ratio between gears 196 and 198 would be such that when the converter is at the 60% output to input shaft speed ratio, the cables 200 and 222 would rotate at exactly the same speed. Similarly, in shifting down from second to low gear, in the ideal case, the cables 200 and 222 would be rotating at the same speed when the converter output and input shafts have a 30% speed ratio.

This same situation would be true in the ideal case where there is a shift from second to third gear, the gear ratio between gears 206 and 196 being such that at 60% output to input speed of the converter, cables 208 and 222 are rotating at the same speed. Such is also the case regarding a shift from third to fourth gears, considering the gear ratio between gears 214 and 196 and the speeds of cables 216 and 222.

However, in the ideal case as outlined above for a shift up, if the transmission output shafts do not continue to increase in speed, but remain at the same speed at which the shift occurred, or are slowed down slightly after the shift, there will be an immediate shift back down. Such shifting back down is avoided in the following manner:

In actual operation when shifting through the gears, the output shafts of the differentials must turn anti-clockwise at from 15 to 20 R. P. M. in order to provide a sufficient force to actuate the fluid valves. Thus, if the gear ratios of gears 198, 206 and 214 to gear 196 are those indicated in the above ideal case, then the shifts upward would not occur until the output to input speed ratio of the converter shafts is somewhat greater than 60%. This will cause a change in the converter output to input shaft ratio to somewhat greater than 30% due to the 2 to 1 change in any shift for my transmission. This will be in a stable zone of operation, because to shift back down, it will require a speed of the output shaft of the shifting differential of from 15 to 20 R. P. M. clockwise, so that this shift will only occur at a converter output to input speed ratio somewhat below 30 R. P. M. Thus, any unnecessary shifting back and forth at the shifting points is completely eliminated.

It should be noted that a much larger increment in the speed of gear 196 is necessary to produce the required 15 to 20 R. P. M. output speed of the differential 220 than is required to produce the same differential output speed in differential 212, for the reason that gear 214 is larger than gear 206, while these two gears both mesh with gear 196. Similarly, it takes a larger increment in the speed of gear 196 to produce the required 15 to 20 R. P. M. output speed of differential 220 or 212 than is required to produce the same differential output speed in differential 204. For this reason, the least stable shift will be that from low to second gear, as the 15 to 20 R. P. M. clockwise of the output shaft of differential 204 necessary to shift back down to low from second gear will be caused by a much slighter lowering of the speed of gear 196 than would be required to shift back down from fourth to third or from third to second. The most stable shift will be from third gear to fourth gear. In like manner, the most stable shift down will be from fourth gear to third, and the least stable will be from second to low.

Compensation can be made for this difference in the stability of the shifts between the various gears in one of several different ways. One method of compensation is to build the valves 266 and 268 in such a manner that more force is required to move the valve actuating stems 262 and 264 than is required to move the actuating stems 274, 276 and 278 of valves 280, 282 and 284. Similarly, less force would be required to shift the stems 290 and 292 than any of the other actuating stems. By this means, the difference in speed between cables 200 and 222 to cause a shift would be greater than the difference in speed of cables 208 and 222, or 216 and 222, whereby the same increment in the speed of shaft 196 from the speed where the converter output to input speed is at the ideal shifting point will be required to make any one of the three automatic shifts either up or down.

Another method of compensation, which is my preferred method, is to so arrange the gear ratios between the respective gears 198, 206 and 214, and gear 196 that the shifts will occur at points on curve A in Figure 8 other than the 30% and 60% output to input speed ratios of the converter. The basis for this means of compensation is that when there is a shift from a point of lower efficiency on the converter efficiency curve to a point of higher efficiency, there will be an instantaneous increase in the speed of the converter output shaft, and hence an instantaneous increase in gear 196. Thus, if a shift upward is being made, and that shift point is for a converter output to input shaft speed ratio of greater than 60%, the shift back will be to a converter output to input shaft speed ratio of greater than 30%, which is at a higher converter efficiency than when the speed ratio is greater than 60%, whereby there will be an instantaneous increase in the speed of the gear 196 and the shift will be a stable one. Similarly, these same shift points may be used for a downward shift, for the reason that to have a stable downward shift, it is desirable to have an instantaneous decrease in the speed of gear 196. Such a decrease will be caused by a shift from a point of greater than 30% converter output to input speed to a point of greater than 60% converter output to input speed.

In using such a spacing to the right from the 30%–60% region of curve A of Figure 8, the amount of the spacing will determine the increase or decrease in the efficiency for any single shift, thereby determining the amount of added stability which is given to the shift. Since the shift from low to second, and back to low was the least stable shift, it is desirable to cause a greater instantaneous increase in the speed of gear 196 for this shift than for the others. A jump in the efficiency of any given amount upon a shift will cause a given increase in the speed of gear 196, whereby the smaller gear 198 will cause a greater jump in the speed of cable 200 than will be caused in the speed of cable 208 from gear 206. Thus, for a given spacing to the right on curve A in Figure 8, there will be a greater stability given to the shift from low to second and back than will be given to the other shifts. This compensates for the lesser stability in the shift out of and into low gear which was heretofore indicated. Points 297 and 299 on curve A in Figure 8 indicate shift points above the 60% and 30%, respectively, values for the output to input shaft speed ratios for the converter.

Having described my five-speed transmission, the differential unit which may be applied thereto and the differential means for determining when the automatic shifts shall occur, I shall now describe the valves which actually shift my transmission and their operation.

Figure 7:
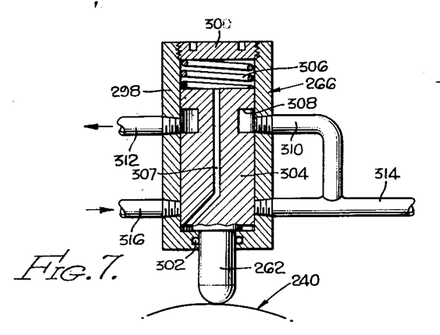
Figure 7 is a sectional view along the line 7—7 in Figure 5, showing the specific construction of one of my fluid valves.

Looking to Figure 7 which is a sectional view of valve 266, I provide a cylindrical valve body 298 having a cap 300 which screws into the top thereof. The bottom of valve body 298 is flanged inwardly to provide a passage to receive actuating stem 262, and is provided with a sealing ring 302 which prevents fluid from escaping valve 266 between valve body 298 and actuating stem 262. Actuating stem 262 is integrally attached to the bottom of a valve element 304 which is urged downward within valve body 298 by means of a spring 306 compressed between cap 300 and the top of valve element 304. A passage 307 connects the upper and lower faces of valve element 304 to prevent pressure from building up in the ends of valve body 266 when valve element 304 is moved up and down.

When valve element 304 is in its lowermost position, which is the normal position, an annular recess 308 in valve element 304 connects fluid line 310 to exhaust line 312 which leads to a fluid reservoir (not shown). Line 310 communicates with a line 314. In this normal position of valve element 304 fluid is not permitted to pass from a fluid pressure line 316 into line 314, as communication between these lines is blocked off by valve element 304. However, when actuating stem 262 is cammed upward, valve element 304 moves upward to permit fluid to flow from fluid pressure line 316 into line 314. At the same time, upward movement of valve element 304 moves annular recess 308 out of communication with lines 310 and 312, whereby the exhaust is blocked off. The other valves 268, 280, 282, 294 and 296 are similarly constructed.

When the engine (not shown), which is operatively connected to my transmission, is first started up and the transmission is in low gear, the drum portions 246, 248 and 250 of eddy-current clutches 240, 242 and 244 are in the positions shown in Figure 4. Rotation of the drum portions 246, 248 and 250 clockwise is restricted by engagement between lugs 318 on the drum portions and lugs 320 on valves 266, 280 and 294, and rotation of the drum portions anti-clockwise is similarly limited by engagement between lugs 322 on the drum portions and lugs 324 on valves 266, 280 and 294. Thus, when the transmission is started up in low gear, drum portions 246, 248 and 250 are all in the position shown in Figure 4 with lugs 318 and 320 in engagement.

In the low gear position, valve 266 is set to admit fluid pressure into line 314 from pressure line 316, and to block off exhaust line 312. Fluid pressure in line 314 actuates brake band 78 by any conventional means (not shown). Fluid pressure is also admitted through valve 280 to line 326 from pressure line 328, the exhaust portion of valve 280 being closed off. This actuates clutch 36 by any conventional means. In the low gear position, valve 268 is exhausted.

Figure 5:
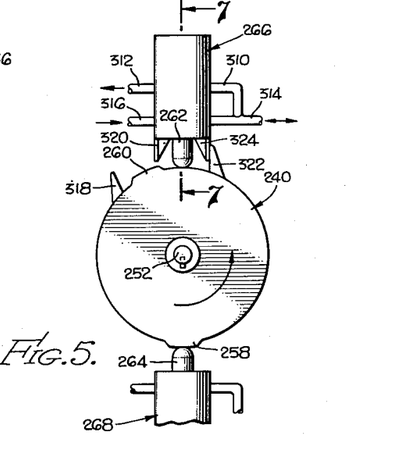
Figure 5 is a plan view of one of the shifting units shown in Figure 4 which has been moved to a different position.

When the point is reached to shift from low to second, drum portion 246 is rotated anti-clockwise, being stopped by engagement between lugs 324 and 322 in the position shown in Figure 5. This causes valve 266 to exhaust, and valve 268 to admit fluid pressure from pressure line 330 to line 332 which connects valves 268 and 282. Movement of valve 266 to the exhaust position releases band 78, and movement of valve 268 to the position to admit fluid pressure to line 332 causes fluid pressure to pass through valve 282, which is in the actuated or pressure admitting position, into fluid line 334 which admits fluid to the fluid operable clutch 101 to cause engagement thereof.

In order to cause the shift into third gear, drum portion 248 of eddy-current clutch 242 moves anti-clockwise until lugs 322 and 324 come into contact. This moves both valves 280 and 282 into the exhaust position, thereby permitting the fluid to be exhausted from fluid lines 326 and 334, respectively, through the respective exhaust lines 336 and 338. This releases clutches 36 and 101. At the same time, valve 284 is moved into the position to admit pressure from fluid pressure line 340 into fluid line 342. Line 342 is then in communication with line 344 through valve 296 which is in the pressure position. A line 346 connects with line 342 before the latter line reaches valve 296. Fluid pressure through line 344 causes engagement of band 60 by any conventional means, and fluid pressure through line 346 engages clutch 38 by any conventional means to complete the shift into third gear.

The automatic shift into fourth gear is effected by rotation of drum portion 250 of eddy-current clutch 244 anti-clockwise to the point where lugs 322 and 324 contact. This causes valve 296 to exhaust fluid from line 344 out through line 348 and valve 294 to admit fluid pressure from fluid pressure line 350 to fluid line 352. Exhausting fluid from line 344 releases band 60, and the admission of fluid pressure to line 352 causes engagement of fluid operable clutch 153 to complete the engagement of fourth gear.

Although I have provided automatic shifting between only four out of the five of my transmission ratios in order to preserve simplicity of construction and desirable operation features, it is to be understood that by the provision of another shifting differential and another eddy-current clutch and associated valve mechanism the automatic shifting could be carried through all five gears. It is also to be noted that my automatic shifting will operate in the same manner in both forward and reverse gears, the only manual control within the first four transmission ratios being the shift between forward and reverse.

The automatic shifting back down through the gears from fourth gear down into low gear is effected in exactly the reverse manner from the shifting upward through the gears. Thus, the automatic shift from fourth gear to third gear is caused by rotation of drum portion 250 back clockwise until lugs 318 and 320 engage. This causes exhausting of line 352 through valve 294 to release of clutch 153, the exhausted fluid being conveyed to the reservoir (not shown) by means of exhaust line 354. Valve 296 is opened to admit pressure to line 344 to actuate band 60.

In a similar manner the shift back from third gear to second gear is effected by rotation of drum portion 248 of eddy-current clutch 242 clockwise, and the shift back down into low gear is caused by rotation of drum portion 246 clockwise.

Although the preferred form of my invention includes the automatic shifting mechanism, it is to be understood that my five-speed transmission comprising a single, compact unit is an advance in the art even without the automatic shifting mechanism. Thus, my invention also contemplates the use of my five-speed transmission in connection with manual controls for actuating the same elements that were actuated by the automatic controls.

Figure 6:
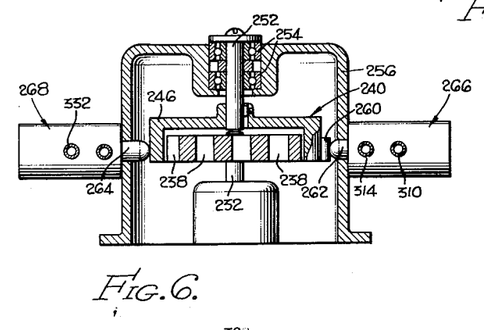
Figure 6 is a sectional view along the line 6—6 in Figure 4, showing my eddy current clutch.

One of the advantages of the particular construction of my automatic shifting mechanism is that it consists solely of mechanical and fluid connections, and electrical circuits form no part of it. For this reason, my automatic shifting mechanism is particularly durable and positive in performance, even under the most adverse operating conditions. In this connection it should be noted that none of the moving parts are left exposed. Thus, the transmission gears are enclosed within the transmission housing 144, which also contains the differential drive gears 198, 206 and 214, differentials 204, 212 and 220 are contained in a housing (not shown) and the eddy-current clutches are encased within housings 256. The only moving members of the valves on the outside thereof are the valve actuating stems, but the valves are so positioned, as shown in Figure 6, that these stems are completely sealed within the eddy-current clutch housings. The differential unit shown in Figure 9 is merely a part of the transmission within housing 144.

Another great advantage of my automatic shifting mechanism is that it will always shift my transmission in such a way that the torque converter between the engine and the transmission continuously operates above a predetermined high efficiency. This is an important factor in rendering my invention commercially acceptable, for not only does it greatly decrease the fuel consumption of the engine and thus decrease the operating expense, but it also insures that at least a given percent of the power output of the engine will be delivered to the driven elements.

In operating my automatic transmission for driving straight ahead it is only necessary to adjust the throttle according to operational demands, and the transmission will smoothly supply the desired torque and output speed. Since the automatic shifts cause a jump between substantially 30% and 60% converter output to input speed, curve A in Figure 8 shows that at most, there will be only a small change in the efficiency of the converter at the time when a shift is made, whereby there will be only a small instantaneous change in the transmission output speed and little or no jerking will be felt in the driven elements.

If the operator then desires to differentially connect the two transmission output shafts, it is only necessary that he move a single valve which will actuate the differential clutch 182 to engage the differential.

If the tractor, tank or other tracked vehicle in which my invention is installed is to be steered by use of the transmission itself, it is only necessary to actuate a steering wheel, or one or two levers, to selectively release the brake band 138 and engage the band 132 on either side of the transmission.

The shifting mechanism in the present application is an improvement of my application Serial No. 254,506, filed November 2, 1951, for Power Transmitting Apparatus, which is a division of my application Serial No. 647,677, filed February 15, 1946, for Transmission for Well Drilling Machinery. The transmission portion of the present invention is a novel arrangement of various elements shown in my application Serial No. 90,473, filed April 29, 1949, now abandoned, for Change-Speed Transmission, and of my application, Serial No. 254,506, filed November 2, 1951, for Power Transmitting Apparatus.

It is to be understood that the form of my invention herein shown and described is my preferred embodiment and that various changes in the shape, size and arrangement of parts may be resorted to without departing from the spirit of my invention, or the scope of the appended claims.

I claim:

1. A power transmission including a planetary gear system having a pair of axially aligned tubular planetary input shafts and a single planetary output shaft centrally positioned within said tubular shafts, a clutch operatively engageable between said output shaft and one of said tubular shafts to alternatively lock the shafts together or permit independent rotation of the shafts, a gear on each end of said output shaft, said gears being in driving relationship, respectively, with planetary reduction gears having planet cages and reaction drums, and braking means on said planet cages and on said drums to alternatively permit rotation of the said cage and locking of the said drum or rotation of the said drum and locking of the said cage on one or both ends of said transmission.

2. A power transmission including a planetary gear system having a pair of axially aligned tubular planetary input shafts and a single planetary output shaft centrally positioned within said tubular shafts, a pair of clutches alternatively operatively engageable between said respective input shafts and said output shaft to lock said shafts together or to permit independent rotation of the shafts, a gear on each end of said output shaft, said gears being in driving relationship, respectively, with planetary reduction gears having planet cages and reaction drums, and braking means on said planet cages and on said drums to alternatively permit rotation of the said cage and locking of the said drum or rotation of the said drum and locking of the said cage on one or both ends of said transmission.

3. A power transmission including a planetary gear system having a pair of axially aligned tubular planetary input shafts and a single planetary output shaft centrally positioned within said tubular shafts, a clutch operatively engageable between said output shaft and one of said tubular shafts to alternatively lock the shafts together or permit independent rotation of the shafts, a gear on each end of said output shaft, said gears being in driving relationship, respectively, with planetary reduction gears having planet cages and reaction drums, braking means on said planet cages and on said drums to alternatively permit rotation of the said cage and locking of the said drum or rotation of the said drum and locking of the said cage on one or both ends of said transmission, and means for driving said tubular input shafts at different speed ratios from a common power source.

4. In a vehicle, a transmission for supplying power and for steering which includes a planetary gear system having a pair of axially aligned tubular planetary input shafts and a single planetary output shaft centrally positioned within said tubular shafts, a clutch operatively engageable between said output shaft and one of said tubular shafts to alternatively lock the shafts together or permit independent rotation of the shafts, a gear on each end of said output shaft, said gears being in driving relationship, respectively, with planetary reduction gears having planet cages and reaction drums, respectively, a brake on each of said planet cages and a brake on each of said reaction drums, said planet cage brakes being normally disengaged and said reaction drum brakes being normally engaged for straight propulsion of said vehicle, and means for simultaneously engaging one of said planet cage brakes and disengaging the corresponding reaction drum brake to steer said vehicle.

5. A power transmission including a planetary gear system having a pair of axially aligned tubular planetary input shafts and a single planetary output shaft centrally positioned within said tubular shafts, said tubular input shafts having a two to one gear ratio through said planetary gear system, a clutch operatively engageable between said output shaft and one of said tubular shafts to alternatively lock the shafts together or permit independent rotation of the shafts, a gear on each end of said output shaft, said gears being in driving relationship, respectively, with planetary reduction gears having planet cages and reaction drums, braking means on said planet cages and on said drum to alternatively permit rotation of the said cage and locking of the said drum or rotation of the said drum and locking of the said cage on one or both ends of said transmission, and selective means for driving said tubular input shafts at speed ratios differing by a multiple of two from a common power source.

6. An automatic shifting mechanism including a multiple speed transmission having input and output shafts, an engine operatively connected to said input shaft, a device for measuring the relative speeds of said engine and said transmission output shaft, an operative connection between said engine and said measuring device, a plurality of geared operative connections having progressively stepped ratios between said output shaft and said measuring device, an automatic shifting unit for automatically shifting said transmission, and an operative connection between said measuring device and said automatic shifting unit.

7. An automatic shifting mechanism including a multiple speed transmission having input and output shafts, an engine operatively connected to said input shaft, a plurality of differentials, each having a pair of input members and an output member, an operative connection between said engine and one input member of each of said differentials, a plurality of geared operative connections having progressively stepped ratios between said output shaft and the other input members of the respective said differentials, an automatic shifting unit for automatically shifting said transmission, and an operative connection between the output member of each of said differentials and said automatic shifting unit.

8. An automatic shifting mechanism including a multiple speed transmission having input and output shafts, an engine operatively connected to said input shaft, a plurality of differentials, each having a pair of input members and an output member, an operative connection between said engine and one input member of each of said differentials, a plurality of geared operative connections having progressively stepped ratios between said output shaft and the other input members of the respective said differentials, an automatic shifting unit for automatically shifting said transmission, the input members of said automatic shifting unit comprising a plurality of eddy-current clutches, and operative connections between the output members of said differentials and the respective said eddy-current clutches.

9. An automatic shifting mechanism including a multiple speed transmission having input and output shafts, an engine operatively connected to said input shaft, a plurality of differentials, each having a pair of input members and an output member, an operative connection between said engine and one input member of each of said differentials, a plurality of geared operative connections having progressively stepped ratios between said output shaft and the other input members of the respective said differentials, a plurality of eddy-current clutches having input and output members, operative connections between said eddy-current clutch input members and said differential output members, respectively, a fluid valve having inlet and outlet ports operatively connected to each of said eddy-current clutch output members, a source of fluid pressure connected to each of said fluid valve inlet ports and an operative connection between each of said fluid valve outlet ports and said transmission to effect shifting of said transmission upon actuation of said valves.

10. In a vehicle, a transmission for supplying power and for steering which includes a planetary gear system having a pair of axially aligned tubular planetary input shafts and a single planetary output shaft centrally positioned within said tubular shafts, a clutch operatively engageable between said output shaft and one of said tubular shafts to alternatively lock the shafts together or permit independent rotation of the shafts, a gear on each end of said output shaft, said gears being in driving relationship, respectively, with planetary reduction gears having planet cages and reaction drums, respectively, a brake on each of said planet cages and a brake on each of said reaction drums, said planet cage brakes being normally disengaged and said reaction drum brakes being normally engaged for straight propulsion of said vehicle, and means for simultaneously engaging one of said planet cage brakes and disengaging the corresponding reaction drum brake to steer said vehicle.

11. A power transmission device including a multiple speed transmission having input and output shafts, an engine operatively connected to said input shaft, a device for measuring the relative speeds of said engine and said transmission output shaft, an operative connection between said engine and said measuring device and a plurality of geared operative connections having progressively stepped ratios between said output shaft and said measuring device.

12. A power transmission device including a multiple speed transmission having input and output shafts, an engine operatively connected to said input shaft, a plurality of differentials, each having a pair of input members and an output member, an operative connection between said engine and one input member of each of said differentials and a plurality of geared operative connections having progressively stepped ratios between said output shaft and the other input members of the respective said differentials.

References Cited in the file of this patent

UNITED STATES PATENTS

| Number | Name | Date |
|---|---|---|
| 1,872,541 | White | Aug. 16, 1932 |
| 1,964,956 | Lincoln | July 3, 1934 |
| 2,164,729 | Wilson | July 4, 1939 |
| 2,171,715 | Sinclair | Sept. 5, 1939 |
| 2,272,934 | Cotal | Feb. 10, 1942 |
| 2,302,714 | Pollard | Nov. 24, 1942 |
| 2,314,664 | Shenstone | Mar. 23, 1943 |
| 2,484,011 | Brunken | Oct. 11, 1949 |
| 2,523,766 | Kelley | Sept. 26, 1950 |
| 2,529,129 | Blair | Nov. 7, 1950 |
| 2,560,554 | Colby | July 17, 1951 |
| 2,569,651 | Bonnan | Oct. 2, 1951 |
| 2,585,790 | Kelley | Feb. 12, 1952 |
| 2,589,119 | O'Leary | Mar. 11, 1952 |
| 2,594,064 | O'Leary | Apr. 22, 1952 |

FOREIGN PATENTS

| Number | Country | Date |
|---|---|---|
| 461,947 | Great Britain | Feb. 26, 1937 |